(12) United States Patent
Park et al.

(10) Patent No.: US 6,940,823 B1
(45) Date of Patent: Sep. 6, 2005

(54) WIDE BAND RADIO TRANSMISSION METHOD

(75) Inventors: Dong-seek Park, Suwon (KR); Jeong-hoon Park, Suwon (KR)

(73) Assignee: Samsung Electronics Co., Ltd., (KR)

( * ) Notice: Subject to any disclaimer, the term of this patent is extended or adjusted under 35 U.S.C. 154(b) by 629 days.

(21) Appl. No.: 09/702,736

(22) Filed: Nov. 1, 2000

(30) Foreign Application Priority Data

Nov. 1, 1999 (KR) ............................... 1999-47961

(51) Int. Cl.[7] .................... H04L 12/16; H04L 12/56
(52) U.S. Cl. ................ 370/252; 370/310; 370/395.21; 370/469
(58) Field of Search ............................... 370/252, 310, 370/352–356, 395.21, 465–474, 345; 725/95; 455/452.2

(56) References Cited

U.S. PATENT DOCUMENTS

| | | | |
|---|---|---|---|
| 5,365,272 A | 11/1994 | Siracusa | 348/426 |
| 5,440,551 A * | 8/1995 | Suzuki | 370/395.21 |
| 5,483,287 A | 1/1996 | Siracusa | 348/426 |
| 5,913,039 A | 6/1999 | Nakamura et al. | 395/200.61 |
| 6,374,112 B1 * | 4/2002 | Widegren et al. | 455/452.2 |
| 6,477,670 B1 * | 11/2002 | Ahmadvand | 714/712 |
| 6,487,595 B1 * | 11/2002 | Turunen et al. | 709/226 |
| 6,501,741 B1 * | 12/2002 | Mikkonen et al. | 370/310 |
| 6,529,633 B1 * | 3/2003 | Easwar et al. | 382/239 |
| 6,587,457 B1 * | 7/2003 | Mikkonen | 370/356 |
| 6,600,732 B1 * | 7/2003 | Sevanto et al. | 370/349 |
| 6,661,780 B2 * | 12/2003 | Li | 370/324 |
| 6,683,866 B1 * | 1/2004 | Stanwood et al. | 370/350 |
| 6,728,208 B1 * | 4/2004 | Puuskari | 370/230.1 |
| 6,728,365 B1 * | 4/2004 | Li et al. | 379/329 |
| 2003/0174731 A1 * | 9/2003 | Tafazolli et al. | 370/469 |

FOREIGN PATENT DOCUMENTS

| | | |
|---|---|---|
| JP | 5-236009 | 9/1993 |
| JP | 6-181472 A | 6/1994 |
| JP | 11-275145 A | 10/1999 |
| WO | WO 99/05828 A1 | 2/1999 |
| WO | WO 99/21338 | 4/1999 |
| WO | WO 99/39480 A2 | 8/1999 |
| WO | WO 99/51055 A2 | 10/1999 |
| WO | WO 00/10357 A1 | 2/2000 |

* cited by examiner

Primary Examiner—Seema S. Rao
Assistant Examiner—Robert C. Schelbel, Jr.
(74) Attorney, Agent, or Firm—Sughrue Mion, PLLC

(57) ABSTRACT

A wide band radio transmission method, apparatus and computer readable medium for transmitting bit streams of a video-related application through a radio channel are provided. The wide band radio transmission method comprises the steps of: (a) obtaining identification information on a video-related application which is executed in a user layer, from the user layer; (b) obtaining information on at least one of channel characteristics and a decoding state from a physical layer; and (c) deciding on a quality of service (QoS) level with reference to the identification information and the information on at least one of the channel characteristics and the decoding state from the physical layer. The wide band radio transmission method can efficiently support video-related applications such as applications of the H.324M standard, the H.323 standard, the H.320 standard, and the MPEG-4 standard. Also, negotiations on video services having different quality of service (QoS) levels can be performed, and then, optimum video services considering channel characteristics can be provided.

14 Claims, 3 Drawing Sheets

WIDE BAND RADIO TRANSMISSION METHOD

BACKGROUND OF THE INVENTION

1. Field of the Invention

The present invention relates to a wide band radio transmission method, and more particularly, to a wide band radio transmission method for use in new generation wide band radio mobile communication. The present application is based on Korean Patent Application No. 99-47961 which is incorporated herein by reference.

2. Description of the Related Art

Referring to FIG. 1, which illustrates a conventional wide band radio transmission method, the layers of protocol in the radio transmission technology (RTT) of a code division multiple access (CDMA) version 2000 include a physical layer, a link layer, and a user layer.

The user layer provides voice service, packet switching data (PSD) service, or circuit switching data (CSD) service, according to the type of application, and video conferencing-related standards based on H.324M standard correspond to the user layer. The link layer performs link access control (LAC) and media access control (MAC), and the physical layer performs bit streaming by receiving simple protocol data and data created from applications of the user layer, through the link layer, and by CDMA encoding.

In FIG. 2, a CRC processing unit receives fixed-size input data such as 24, 56, 126, 268 bits, and then inserts, for example, 6-bit through 12-bit redundancy codes for error-detection in bit streams. A tail bit inserting unit inserts encoder tail bits for resetting a convolution coding unit on the end portion of data in the bit stream. The convolution coding unit assigns error resilience by performing convolution-coding on the bit stream. Next, an interleaving unit relieves shock due to a burst error by performing interleaving of data. A pseudo-random number code or a long code is inserted in the interleaved data, and a modulating unit generates signals $Y_I$ and $Y_Q$ formed of a real part and an imaginary part by performing CDMA spreading.

In the conventional wide band radio transmission method as shown in FIGS. 1 and 2, transmission or reception of voice and other data is performed, and a fixed-size packet is always received. The above conventional wide band radio transmission method can be implemented in the phase 1 standard of a wide band CDMA, which is referred to as "IMT-2000" in the U.S.A.

Meanwhile, besides voice data, video-related data can be transmitted/received, and the standardization of an upgraded wide band radio transmission method by which data is transmitted/received at a higher Pseudo Noise (PN) rate is in progress.

Since no mark on the kind of video-related applications is defined in the conventional wide band radio transmission method and no mark on the quality of service (QoS) parameter of video service is defined in the conventional wide band radio transmission method, video-related applications such as applications of the H.324M standard, the H.323 standard, the H.320 standard, and the MPEG-4 standard cannot be efficiently supported.

SUMMARY OF THE INVENTION

To solve the above problems, it is a first object of the present invention to provide a wide band radio transmission method in which video-related applications can be efficiently supported.

It is a second object of the present invention to provide a computer readable medium for storing program codes for implementing the wide band radio transmission method.

It is a third object of the present invention to provide a wide band radio transmission apparatus for implementing the wide band radio transmission method.

It is a fourth object of the present invention to provide a wide band radio reception method for receiving bit streams of a video-related application, which are created by the wide band radio transmission method, through a radio channel.

It is a fifth object of the present invention to provide a computer readable medium for storing program codes for implementing the wide band radio reception method.

Accordingly, to achieve the first object, according to one aspect of the present invention, there is provided a wide band radio transmission method. The method comprises the steps of: (a) obtaining identification information on a video-related application which is executed in a user layer, from the user layer; (b) obtaining information on at least one of channel characteristics and a decoding state from a physical layer; and (c) deciding on a quality of service (QoS) level with reference to the identification information and the information on the channel characteristics and the decoding state from the physical layer.

The method further comprises the step of (d) inserting an identifier field, which corresponds to the identification information, in a bit stream.

The method further comprises the step of (e) inserting a quality of service (QoS) parameter field for indicating the QoS level of the video-related application, in the bit stream.

The method, after the step (e), further comprises the step of (f) outputting the bit stream in which the identifier field, the QoS parameter field, and payload data are inserted.

The step (f) comprises the steps of: (f-1) checking whether the bit stream is byte-aligned; (f-2) preparing stuffing bits when the bit stream is not byte-aligned; and (f-3) outputting the bit stream including the identifier field, the QoS parameter field, the payload data, and the stuffing bits.

Preferably, the steps (a) and (b) are performed by a call setup process of performing radio transmission.

In order to achieve the first object, according to another aspect of the present invention, there is provided a wide band radio transmission method for transmitting a bit stream of a video-related application through a radio channel. The method comprises the steps of: (a) obtaining identification information on what a video-related application is executed in a user layer, from the user layer; (b) deciding on a quality of service (QoS) level with reference to the identification information from the user layer and information on at least one of channel characteristics and a decoding state from a physical layer; (c) inserting an identifier field, which corresponds to the identification information, in the bit stream; (d) inserting a quality of service (QoS) parameter field for indicating the QoS level of the corresponding video-related application, in the bit stream; (e) inserting payload data which is pure video data output from the video-related application, in the bit stream; and (f) outputting the bit stream in which the identifier field, the QoS parameter field, and the payload data are inserted.

In order to achieve the second object, there is provided a computer readable medium for storing program codes for implementing a wide band radio transmission method for transmitting bit streams of a video-related application through a radio channel. The program codes comprise the steps of: (a) obtaining identification information on whether any video-related application is executed in a user layer, from the user layer; (b) deciding on a quality of service (QoS) level with reference to the identification information from the user layer and information on at least one of channel characteristics and a decoding state from a physical layer; (c) inserting an identifier field, which corresponds to the identification information, in a bit stream; (d) inserting a quality of service (QoS) parameter field for indicating the QoS level of the corresponding video-related application, in the bit stream; (e) inserting payload data which is pure video data output from the video-related application, in the bit stream; and (f) outputting the bit stream in which the identifier field, the QoS parameter field, and the payload data are inserted.

In order to achieve the third object, there is provided a wide band radio transmission apparatus for transmitting bit streams of a video-related application through a radio channel. The apparatus implements layers of protocol. The layers include a user layer for providing voice service, packet switching data (PSD) service, or circuit switching data (CSD) service, according to the type of the application, and for outputting identification information on whether any video-related application is executed. The layers of protocol also include a link layer for performing link access control (LAC) and media access control (MAC) and for deciding on a quality of service (QoS) level with reference to the identification information from the user layer and information on at least one of channel characteristics and a decoding state from a physical layer. Further included in the layers of protocol is a bit stream reconfiguration layer for inserting an identifier field, which corresponds to the identification information, a quality of service (QoS) parameter field for indicating the QoS level of the corresponding video-related application, and payload data which is pure video data output from the video-related application, in a bit stream, and a physical layer for performing bit streaming so that the payload data in which the identifier field and the QoS parameter field are inserted, is received through the bit stream reconfiguration layer and transmitted on a radio channel.

In order to achieve the fourth object, there is provided a wide band radio reception method for receiving bit streams of a video-related application through a radio channel. The method comprises the steps of: receiving a bit stream in which an identifier field, a quality of service (QoS) parameter field, and payload data are inserted; and performing a call setup negotiation with reference to the video-related application which corresponds to the identifier field and the quality of service (QoS) level of the video-related application which corresponds to the QoS parameter field.

In order to achieve the fifth object, there is provided a computer readable medium for storing program codes for implementing a wide band radio reception method for receiving bit streams of a video-related application through a radio channel. The program codes comprise the steps of: receiving a bit stream in which an identifier field, a quality of service (QoS) parameter field, and payload data are inserted; and performing a call setup negotiation with reference to the video-related application which corresponds to the identifier field and the quality of service (QoS) level of the video-related application which corresponds to the QoS parameter field.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
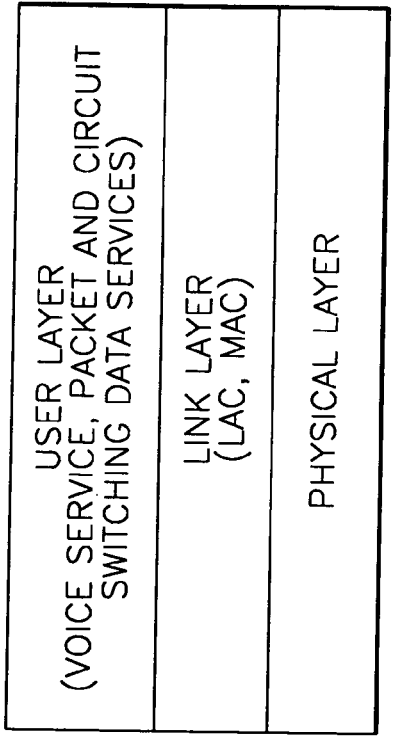
FIG. 1 is a block diagram illustrating the structure of the layers of protocol used in a conventional wide band radio transmission method.
Figure 2:
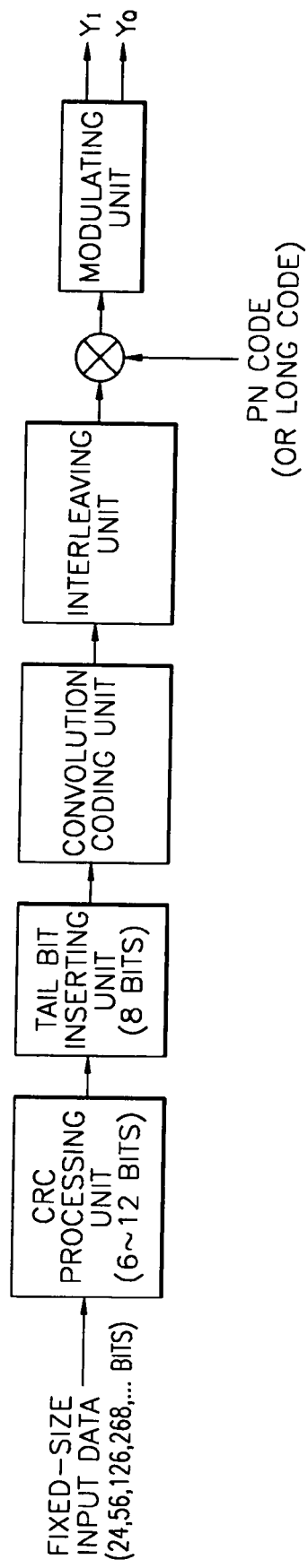
FIG. 2 is a block diagram illustrating bit streaming performed in the physical layer of FIG. 1.
Figure 3:
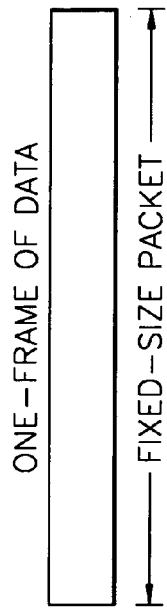
FIG. 3 is a block diagram illustrating that a fixed-size packet input to a CRC processing unit of FIG. 2 forms one-frame of data.
Figure 4:
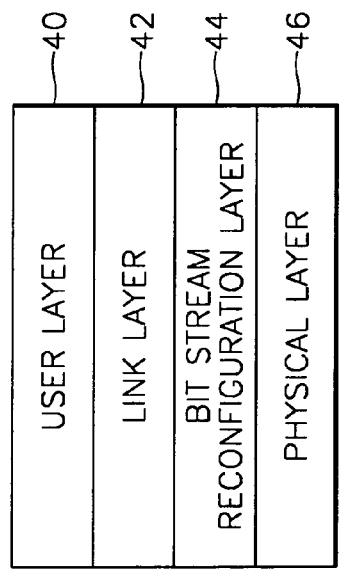
FIG. 4 is a block diagram illustrating the layers of protocol for implementing a wide band radio transmission method according to the present invention.

Referring to FIG. 4, the layers of protocol for implementing a wide band radio transmission method according to the present invention include a user layer 40, a link layer 42, a bit stream reconfiguration layer 44, and a physical layer 46. The layers of protocol of FIG. 4 are illustrated to be compared with the three layers in the radio transmission technology (RTT) of a code division multiple access (CDMA) version 2000.

Figure 5:
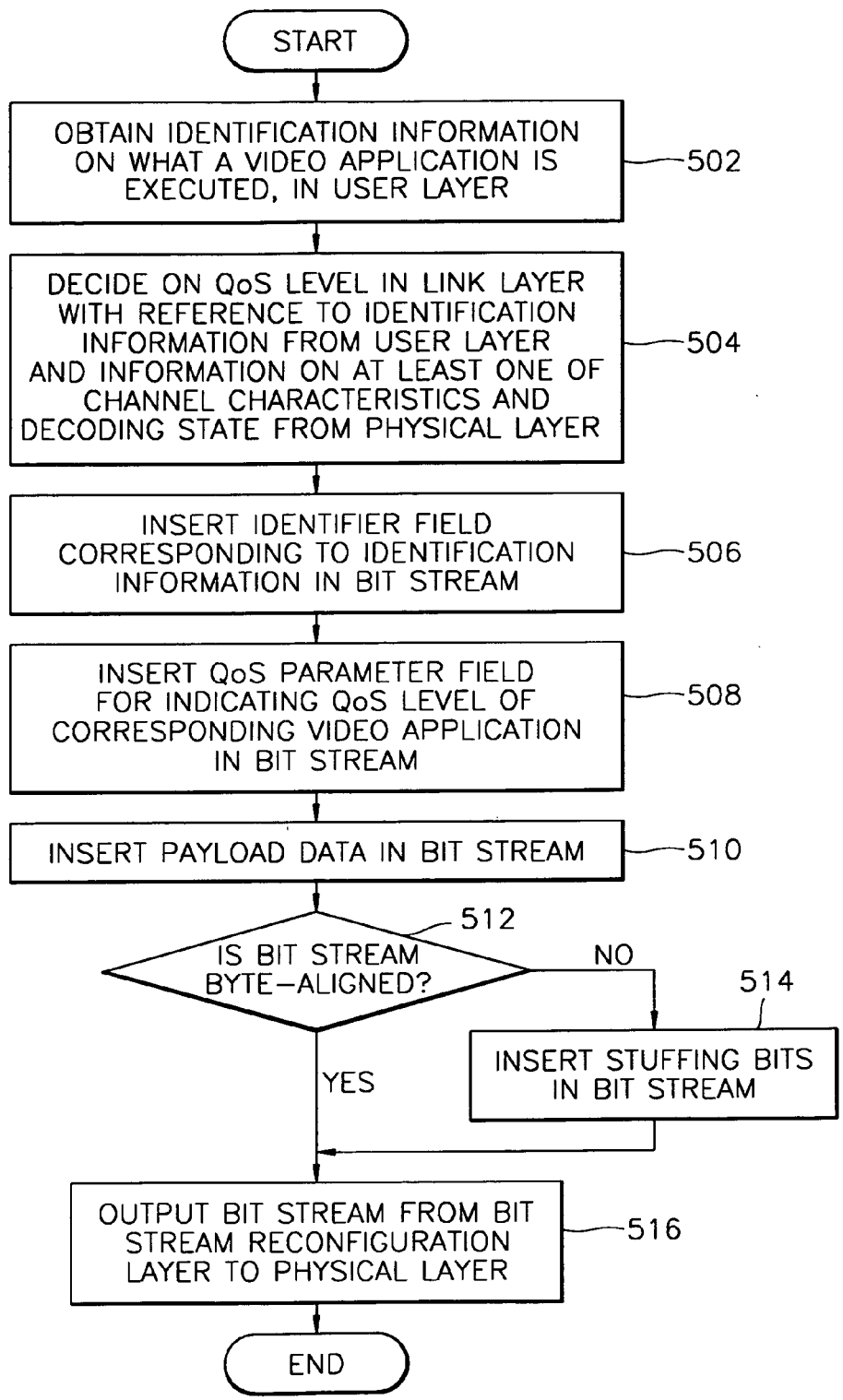
FIG. 5 is a flow chart illustrating a wide band radio transmission method according to a preferred embodiment of the present invention.

Referring to FIG. 5, in the wide band radio transmission method according to the present invention, which is implemented by the layers of protocol of FIG. 4, first, identification information on what a video application is executed, is obtained in the user layer 40 (step 502). Next, a quality of service (QoS) level is decided on in the link layer 42 with reference to the identification information from the user layer 40 and information on at least one of channel characteristics such as a block error rate (BER), a packet loss rate and delay, and a decoding state from the physical layer 46 (step 504).

Next, in the bit stream reconfiguration layer 44, an identifier field indicating what video application is running, is inserted in a bit stream (step 506). Preferably, the identifier field indicates the type of the video application. The identifier field is preferably comprised of 4 bits. Also, information on the type of the video application can be information on video services such as the H.324M standard, the H.323 standard and the H.320 standard.

Also, in the bit stream reconfiguration layer 44, a quality of service (QoS) parameter field for indicating the QoS level of the corresponding video application is inserted in the bit stream (step 508). The QoS parameter field functions as a field for defining a QoS level to transmit and receive data during call setup with a recipient.

Next, payload data which is pure video data output from the video-related application, is inserted in the bit stream (step 510).

Next, it is checked whether the bit stream, in which the identifier field, the QoS parameter field, and the video-related payload data field are inserted, is byte-aligned (step 512). That is, when N is a predetermined positive integer, it is checked whether the length of the bit stream corresponds to 8×N.

When it is determined that the bit stream is not byte-aligned in the step 512, in the bit stream reconfiguration layer 44, stuffing bits are prepared and inserted in the bit stream (step 514). The number of bits of the entire bit stream in which the stuffing bits are inserted is aligned by 8×M. That is, since one byte is comprised of 8 bits, the inserted stuffing bits are 1 through 7 bits.

Next, in the bit stream reconfiguration layer 44, the byte-aligned bit stream is output from the bit stream reconfiguration layer 44 to the physical layer 46 (step 516). As a result, constant video payload is created and output.

Since the QoS level to be transmitted and received when performing video-related services must be decided before call setup, preferably, the steps 502 and 504 are performed by default in the step of call setup for performing radio transmission.

Figure 6:
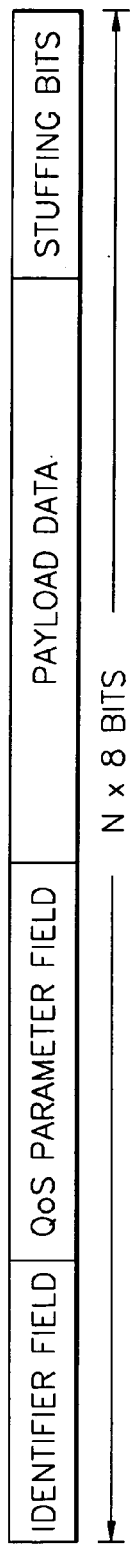
FIG. 6 is a block diagram illustrating the syntax of a bit stream generated by the wide band radio transmission method according to the present invention.

Referring to FIG. 6, the byte-aligned bit stream corresponds to the bit stream before PN encoding. Also, the identifier field, the QoS parameter field, and the stuffing bits field, which are inserted in the byte-aligned bit stream, must be understood as a new syntax which is not defined in conventional radio data transmission.

The bit streams of the video-related application created by the above described wide band radio transmission method can be transmitted through a radio channel. The bit streams transmitted through the radio channel can be received by the recipient. The received bit streams can be processed by a wide band radio reception method according to the present invention.

In the wide band radio reception method according to the present invention, first, a bit stream, which is transmitted through a radio channel and includes an identifier field, a QoS parameter field, and a payload data field, is received. Next, the identifier field and the QoS parameter field are extracted from the bit stream. Next, a call setup negotiation can be performed with reference to the video-related application corresponding to the identifier field and the QoS level of the video-related application corresponding to the QoS parameter field. Specifically, in the call setup negotiation, the bit rate at which data is to be transmitted and received is decided with reference to information on the characteristics of a communication channel, which can be obtained from a back channel in a physical channel, for example, a block error rate (BER), a packet loss rate and delay, and the QoS level of the video-related application corresponding to the QoS parameter field contained in the transmitted bit stream.

In other words, the bit rate relating to the quality of video can be adaptively decided by performing the negotiation between a sender and a recipient with reference to the characteristics of the channel and the QoS level of the application. Likewise, since the bit rate can be adaptively decided, for example, in a case where the QoS level of the video-related application is high and the capacity of the bit rate of the channel is redundant, error resilience can be added by adding a large amount of redundancy codes. On the other hand, in a case where the QoS level of the video-related application is low and the capacity of the bit rate of the channel is not redundant, overhead can be reduced by adding a small amount of redundancy codes.

The above wide band radio transmission method and wide band radio reception method can be embodied in a computer program. The program includes program codes and code segments for performing the steps of the above methods. The codes and code segments composing the program can easily be inferred by a skilled computer programmer in the art. Also, the program can be stored on computer readable media. The media can include magnetic media such as a floppy disk or a hard disk and optical media such as a CD-ROM or a digital video disc (DVD). Also, the program can be transmitted by carrier waves such as the Internet.

As described above, video-related applications such as applications of the H.324M standard, the H.323 standard, the H.320 standard, and the MPEG-4 standard can be efficiently supported.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A wide band radio transmission method comprising the steps of:
   (a) obtaining identification information on a video-related application which is executed in a user layer, from the user layer;
   (b) obtaining information on at least one of channel characteristics and a decoding state from a physical layer;
   (c) deciding on a quality of service (QoS) level in a link layer with reference to the identification information and the information on at least one of the channel characteristics and the decoding state from the physical layer and;
   (d) inserting an identifier field, which corresponds to the identification information, in a bit stream from a bit stream reconfiguration layer.

2. The wide band radio transmission method according to claim 1, further comprising the step of (e) inserting a quality of service (QoS) parameter field for indicating the QoS level of the video-related application, in a bit stream.

3. The wide band radio transmission method according to claims 2 after the step (e), further comprising the step of (f) outputting the bit stream in which the identifier field, the QoS parameter field, and payload data are inserted.

4. The wide band radio transmission method according to claim 3, wherein the step (f) comprises the steps of:
   (f-1) checking whether the bit stream is byte-aligned;
   (f-2) preparing stuffing bits when the bit stream is not byte-aligned; and
   (f-3) outputting the bit stream including the identifier field, the QoS parameter field, the payload data, and the stuffing bits.

5. The wide band radio transmission method according to claim 1, wherein the steps (a) and (b) are performed by a call setup process of performing radio transmission.

6. A wide band radio transmission method for transmitting bit streams of a video-related application through a radio channel, comprising the steps of:
   (a) obtaining identification information on a video-related application which is executed in a user layer, from the user layer;
   (b) deciding on a quality of service (QoS) level in a link layer with reference to the identification information from the user layer and information on at least one of channel characteristics and a decoding state from a physical layer;
   (c) inserting an identifier field, which corresponds to the identification information, in a bit stream from a bit stream reconfiguration layer;
   (d) inserting a quality of service (QoS) parameter field for indicating the QoS level of the corresponding video-related application, in the bit stream;
   (e) inserting payload data which is pure video data output from the video-related application, in the bit stream; and (f) outputting the bit stream in which the identifier field, the QoS parameter field, and the payload data are inserted.

7. The wide band radio transmission method according to claims 6, wherein the step (f) comprises the steps of:
   (f-1) checking whether the bit stream is byte-aligned;
   (f-2) preparing stuffing bits when the bit stream is not byte-aligned; and
   (f-3) outputting the bit stream including the identifier field, the QoS parameter field, the payload data, and the stuffing bits.

8. The wide band radio transmission method according to claim 6, wherein the steps (a) and (b) are performed by a call setup process of performing radio transmission.

9. A computer readable medium for storing a program code for implementing a wide band radio transmission method for transmitting bit streams of a video-related application through a radio channel, wherein the program code comprises the steps of:
   (a) obtaining identification information on a video-related application which is executed in a user layer, from the user layer;
   (b) deciding on a quality of service (QoS) level in a link layer with reference to the identification information from the user layer and information on at least one of channel characteristics and a decoding state from a physical layer;
   (c) inserting an identifier field, which corresponds to the identification information, in a bit stream, from a bit stream reconfiguration layer;
   (d) inserting a quality of service (QoS) parameter field for indicating the QoS level of the corresponding video-related application, in the bit stream;
   (e) inserting payload data which is pure video data output from the video-related application, in the bit stream; and
   (f) outputting the bit stream in which the identifier field, the QoS parameter field, and the payload data are inserted.

10. The computer readable medium according to claim 9, wherein the step (f) comprises:
   (f-1) checking whether the bit stream is byte-aligned;
   (f-2) preparing stuffing bits when the bit stream is not byte-aligned; and
   (f-3) outputting the bit stream including the identifier field, the QoS parameter field, the payload data, and the stuffing bits.

11. A wide band radio transmission apparatus for transmitting bit streams of a video-related application through a radio channel, comprising layers of protocol, wherein the layers include:
   a user layer for providing voice service, packet switching data (PSD) service, or circuit switching data (CSD) service, according to the type of the application, and for outputting identification information on a video-related application which is executed;
   a link layer for performing link access control (LAC) and media access control (MAC) and for deciding on a quality of service (QoS) level with reference to the identification information from the user layer and information on at least one of channel characteristics and a decoding state from a physical layer;
   a bit stream reconfiguration layer for inserting an identifier field, which corresponds to the identification information, a quality of service (QoS) parameter field for indicating the QoS level of the corresponding video-related application, and payload data which is pure video data output from the video-related application, in a bit stream; and
   a physical layer for performing bit streaming so that the payload data in which the identifier field and the QoS parameter field are inserted, is received through the bit stream reconfiguration layer and transmitted on a radio channel.

12. The wide band radio transmission apparatus according to claim 11, wherein the physical layer checks whether the bit stream input to the physical layer is byte-aligned and inserts stuffing bits for byte-aligning when the bit stream is not byte-aligned.

13. A wide band radio reception method for receiving bit streams of a video-related application through a radio channel, comprising the steps of:
   receiving a bit stream in which an identifier field, a quality of service (QoS) parameter field, and payload data are inserted, at least one of the identifier field and the QOS parameter being inserted from a bit stream reconfiguration layer from a protocol of four layers including a user layer, a link layer, a physical layer, and the bit stream reconfiguration layer; and
   performing a call setup negotiation with reference to the video-related application which corresponds to the identifier field and the quality of service (QoS) level of the video-related application which corresponds to the QoS parameter field.

14. A computer readable medium for storing a program code for implementing a wide band radio reception method for receiving bit streams of a video-related application through a radio channel, wherein the program code comprises the steps of:
   receiving a bit stream in which an identifier field, a quality of service (QoS) parameter field, and payload data are inserted, at least one of the identifier field and the QOS parameter being inserted from a bit stream reconfiguration layer from a protocol of four layers including a user layer, a link layer, a physical layer, and the bit stream reconfiguration layer; and
   performing a call setup negotiation with reference to the video-related application which corresponds to the identifier field and the quality of service (QoS) level of the video-related application which corresponds to the QoS parameter field.

* * * * *